US011678103B2

(12) United States Patent
Brodie et al.

(10) Patent No.: US 11,678,103 B2
(45) Date of Patent: Jun. 13, 2023

(54) AUDIO SYSTEM WITH TISSUE TRANSDUCER DRIVEN BY AIR CONDUCTION TRANSDUCER

(71) Applicant: META PLATFORMS TECHNOLOGIES, LLC, Menlo Park, CA (US)

(72) Inventors: John Raymond Brodie, Bend, OR (US); Morteza Khaleghimeybodi, Bothell, WA (US); Chuming Zhao, Bellevue, WA (US); Drew Stone Briggs, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 87 days.

(21) Appl. No.: 17/474,541

(22) Filed: Sep. 14, 2021

(65) Prior Publication Data

US 2023/0083937 A1 Mar. 16, 2023

(51) Int. Cl.

*H04R 1/10* (2006.01)
*H04R 1/02* (2006.01)
(Continued)

(52) U.S. Cl.

CPC ........... *H04R 1/1066* (2013.01); *H04R 1/028* (2013.01); *H04R 1/2819* (2013.01);
(Continued)

(58) Field of Classification Search

CPC .... H04R 1/1066; H04R 1/028; H04R 1/2819; H04R 5/0335; H04R 2400/11; H04R 2460/13
See application file for complete search history.

(56) References Cited

U.S. PATENT DOCUMENTS 1,983,178 A 12/1934 Lybarger
5,867,582 A 2/1999 Nagayoshi
(Continued)

FOREIGN PATENT DOCUMENTS

CN 101766036 A 6/2010
CN 207744106 U * 8/2018
(Continued)

OTHER PUBLICATIONS

Non-Final Office Action dated Nov. 17, 2021 for U.S. Appl. No. 16/932,540, filed Jul. 17, 2020, 11 pages.
(Continued)

*Primary Examiner* — Angelica M McKinney
(74) *Attorney, Agent, or Firm* — Fenwick & West LLP

(57) ABSTRACT

Embodiments relate to an audio system configured to provide enhancement of low audio frequencies. The audio system includes a tissue transducer and a speaker coupled to the tissue transducer. The tissue transducer is configured to be coupled to a tissue of a user (e.g., pinna of a user's ear). The speaker includes a diaphragm having a first surface and a second surface that is opposite the first surface. The first surface is configured to generate a first set of airborne acoustic pressure waves, and the second surface is configured to generate a backpressure. The tissue transducer is driven by the backpressure to vibrate the tissue to form a second set of acoustic pressure waves. The first set of airborne acoustic pressure waves and the second set of acoustic pressure waves together form audio content that is presented to the user.

20 Claims, 8 Drawing Sheets

(51) Int. Cl.
*H04R 1/28* (2006.01)
*H04R 5/033* (2006.01)

(52) U.S. Cl.
CPC ........ *H04R 5/0335* (2013.01); *H04R 2400/11* (2013.01); *H04R 2460/13* (2013.01)

(56) References Cited

U.S. PATENT DOCUMENTS

| | | | |
|---|---|---|---|
| 7,564,988 | B2 | 7/2009 | Azima et al. |
| 8,086,288 | B2 | 12/2011 | Klein |
| 8,842,870 | B2 | 9/2014 | East et al. |
| 8,977,376 | B1 | 3/2015 | Lin et al. |
| 9,020,168 | B2 | 4/2015 | Karkkainen et al. |
| 9,648,438 | B1 | 5/2017 | Petrov |
| 10,631,075 | B1 | 4/2020 | Patil et al. |
| 10,721,572 | B2 | 7/2020 | Petersen et al. |
| 10,893,357 | B1 | 1/2021 | Oishi et al. |
| 11,405,734 | B1 * | 8/2022 | Fu ........................ H04R 25/604 |
| 2005/0201574 | A1 | 9/2005 | Lenhardt |
| 2006/0262954 | A1 * | 11/2006 | Lee ........................ H04M 1/03 381/380 |
| 2008/0037801 | A1 | 2/2008 | Alves et al. |
| 2010/0174767 | A1 | 7/2010 | Villemoes |
| 2011/0224481 | A1 | 9/2011 | Lee et al. |
| 2011/0301729 | A1 | 12/2011 | Heiman et al. |
| 2012/0177209 | A1 | 7/2012 | Goldstein et al. |
| 2013/0051585 | A1 | 2/2013 | Karkkainen et al. |
| 2013/0216052 | A1 | 8/2013 | Bruss et al. |
| 2013/0315422 | A1 | 11/2013 | Tanaka |
| 2014/0185819 | A1 | 7/2014 | Gleissner |
| 2014/0363002 | A1 | 12/2014 | Kupershmidt et al. |
| 2014/0363003 | A1 | 12/2014 | Kupershmidt et al. |
| 2014/0363033 | A1 | 12/2014 | Heiman et al. |
| 2015/0181338 | A1 | 6/2015 | Hosoi et al. |
| 2015/0271590 | A1 | 9/2015 | Nakagawa et al. |
| 2017/0228995 | A1 | 8/2017 | Hosoi et al. |
| 2017/0318379 | A1 | 11/2017 | Bullen et al. |
| 2018/0227687 | A1 | 8/2018 | Thomson |
| 2020/0389716 | A1 | 12/2020 | Mehra et al. |
| 2021/0105552 | A1 | 4/2021 | Khaleghimeybodi et al. |
| 2021/0168494 | A1 * | 6/2021 | Zhang ..................... H04M 1/78 |
| 2021/0228149 | A1 | 7/2021 | Udani et al. |

FOREIGN PATENT DOCUMENTS

| | | | | |
|---|---|---|---|---|
| EP | 3445066 | A1 | | 2/2019 |
| JP | 2015179945 | A | | 10/2015 |
| KR | 20160032642 | A | * | 3/2016 |
| KR | 20160051509 | A | * | 5/2016 |
| KR | 20160111280 | A | | 9/2016 |
| KR | 101724050 | B1 | | 4/2017 |
| WO | 2017189876 | A1 | | 11/2017 |

OTHER PUBLICATIONS

European Search Report for European Patent Application No. 19910581.8, dated Dec. 9, 2021, 6 pages.

Notification of the First Office Action dated Dec. 17, 2021 for Chinese Application No. 201980029458.0, filed Apr. 11, 2019, 17 pages.

Office Action dated Jun. 16, 2022 for Chinese Application No. 201980029458.0, filed Apr. 11, 2019, 14 pages.

United States Office Action, U.S. Appl. No. 15/967,924, dated Jun. 27, 2019, 12 pages.

Office Action dated Nov. 8, 2022 for Japanese Patent Application No. 2021-530143, filed on May 27, 2021, 9 pages.

International Preliminary Report on Patentability for International Application No. PCT/US2019/026944, dated Nov. 12, 2020, 10 pages.

International Search Report and Written Opinion for International Application No. PCT/US2019/013858, dated Oct. 14, 2019, 8 pages.

International Search Report and Written Opinion for International Application No. PCT/US2019/026944, dated Jun. 14, 2019, 12 pages.

International Search report and Written Opinion for International Application No. PCT/US2022/043425, dated Jan. 9, 2023, 8 pages.

* cited by examiner

300

AUDIO SYSTEM WITH TISSUE TRANSDUCER DRIVEN BY AIR CONDUCTION TRANSDUCER

FIELD OF THE INVENTION

The present disclosure relates generally to an audio system, and more specifically relates to an audio system with a tissue transducer that is configured to be driven by an air conduction transducer.

BACKGROUND

Audio systems typically enhance low frequency sounds by utilizing loudspeakers with a larger form factor, or by utilizing tissue conduction devices (e.g., cartilage conduction transducers and/or bone conduction transducers) that have clunky form factors and usability issues. Generating and enhancing low frequency sounds become difficult when loudspeakers are reduced to a size that can fit on an artificial reality headset (e.g., head-mounted display and/or near-eye display). Additionally, the cartilage conduction transducers with small form factors are difficult to deploy on their own. Thus, it is desirable to implement an audio system with a small form factor to fit on a headset that is configured to efficiently enhance audio content in a low frequency band.

SUMMARY

An audio system is configured to provide enhancement of low audio frequencies. The audio system includes at least one tissue transducer (e.g., cartilage conduction transducer and/or bone conduction transducer), an air conduction transducer (i.e., a speaker), and a controller. The at least one tissue transducer is coupled to (i.e., in contact with) at least one tissue (e.g., a pinna of a user's ear and/or a bone behind the user's ear). The air conduction transducer is coupled to the at least one tissue transducer to drive the at least one tissue transducer. The controller generates audio instructions for the air conduction transducer instructing the air conduction transducer to generate airborne acoustic waves, the airborne acoustic waves causing a backpressure. The at least one tissue transducer is driven by the backpressure to vibrate the at least one tissue causing the at least one tissue to create acoustic pressure waves that form at least a portion of audio content for presentation to a user of the audio system.

In some embodiments, the audio system includes a tissue transducer and a speaker coupled to the tissue transducer to drive the tissue transducer. The tissue transducer is configured to be coupled to a tissue of the user's ear (e.g., pinna). The speaker includes a diaphragm having a first surface and a second surface that is, e.g., the opposite side of the first surface. When the diaphragm vibrates, the first surface is configured to generate a first set of airborne acoustic pressure waves, and the second surface is configured to generate a backpressure acoustic wave. The tissue transducer is driven by the backpressure acoustic wave to vibrate the tissue (e.g., pinna) to form a second set of acoustic pressure waves. The first set of airborne acoustic pressure waves and the second set of acoustic pressure waves together form audio content that is presented to the user.

In some embodiments, a method for presenting audio content with enhanced low audio frequencies via an audio system is disclosed herein. The method includes generating, via a first surface of a diaphragm of the audio system, a first set of airborne acoustic pressure waves, generating, via a second surface of the diaphragm that is on the opposite side of the first surface, a corresponding backpressure, and driving a tissue transducer of the audio system using the backpressure to cause the tissue transducer to vibrate a tissue of a user, the vibrating tissue forming a second set of acoustic pressure waves, and the first set of airborne acoustic pressure waves and the second set of acoustic pressure waves together form the audio content that is presented to the user.

Figure 1A:
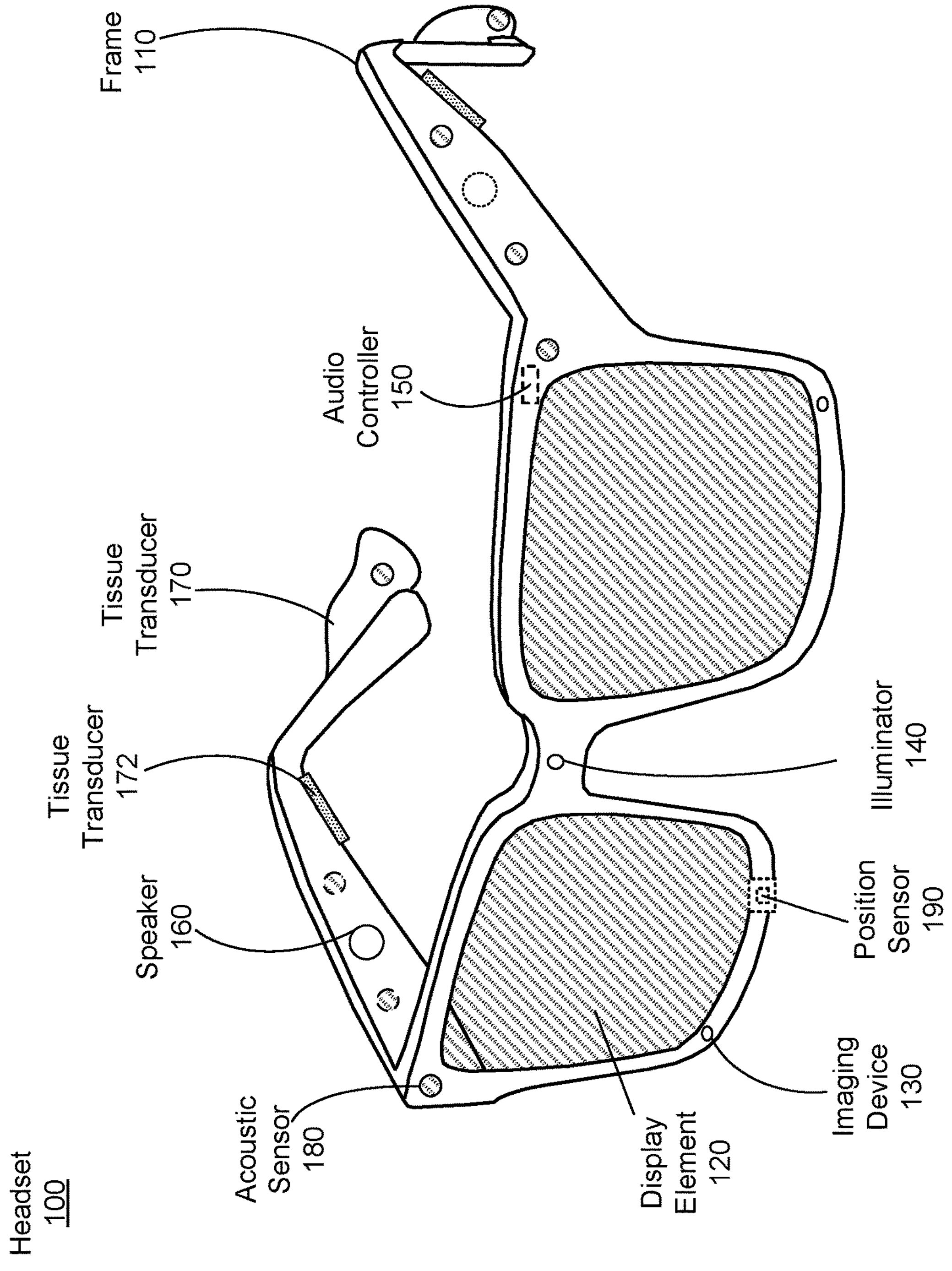
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An audio system that presents improved audio content to a user is presented herein. The audio system includes an air coupled tissue transducer sensor. The air coupled tissue transducer includes an air conduction transducer (i.e., speaker) coupled to the one or more tissue transducers (e.g., cartilage conduction transducer(s) and/or a bone conduction transducer(s)) for driving the one or more tissue transducers. A backpressure generated by the air conduction transducer is used to drive the one or more tissue transducers to vibrate at least one tissue of a user's ear to form a set of airborne acoustic pressure waves. The one or more tissue transducers are thus configured to convert an acoustic signal (i.e., the backpressure) into mechanical vibrations of the at least one tissue of the user's ear producing the airborne acoustic pressure waves. The air conduction transducer is configured to both create sounds propagated through the air, as well as vibrations mechanically coupled to the user's ear via a direct contact with the one or more tissue transducers. The audio system with the air coupled tissue transducer is configured to provide enhancement of low audio frequencies of the air conduction transducer.

The audio system with the one or more tissue transducers driven by the air conduction transducer provides efficient enhancement of low audio frequencies (e.g., frequencies below 1000 Hz) while having a small form factor. Thus, the audio system presented herein is suitable for integration into a headset or in general into any wearable device.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated in FIG. 1A, the headset 100 includes a display element 120 for each eye of a user. In some embodiments, a display element 120 generates image light that is provided to an eye box of the headset 100. The eye box is a location in space that an eye of the user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eye box of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that the user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eye box. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eye box. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light depth sensing, passive stereo analysis, active stereo analysis (which uses texture added to the scene by light from the illuminator 140), some other technique to determine depth of a scene, or some combination thereof.

The audio system provides audio content to the user wearing the headset 100. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the audio controller 150 may be performed by a remote server.

The transducer array presents sound to the user. The transducer array includes a plurality of transducers. A transducer may be a speaker 160, a tissue transducer 170 (e.g., a bone conduction transducer or a cartilage conduction transducer) or a tissue transducer 172 (e.g., a bone conduction transducer or a cartilage conduction transducer). Although the speakers 160 are shown exterior to the frame 110, the speakers 160 may be enclosed in the frame 110. The tissue transducers 170, 172 couple to the head of the user and directly vibrate at least one tissue (e.g., bone and/or cartilage) of the user to generate sounds. In accordance with embodiments of the present disclosure, the transducer array comprises at least two different types of transducers (e.g., the speakers 160, the tissue transducer 170, and/or the tissue transducer 172) for one or both ears of the user. The locations of transducers may be different from what is shown in FIG. 1A.

In accordance with embodiments of the present disclosure, the speaker 160 and the tissue transducer 172 (and/or the tissue transducer 170) are coupled together via, e.g., an enclosure (or housing) integrated into the frame 110 (not shown in FIG. 1A), which is at least partially shared between the speaker 160 and the tissue transducer 172 (and/or the tissue transducer 170). That way, the speaker 160 is capable of driving the tissue transducer 172 (and/or the tissue transducer 170) by producing a backpressure that is propagated through the enclosure toward the tissue transducer 172 (and/or the tissue transducer 170). In one or more embodiments, the backpressure generated by the speaker 160 is provided to an audio waveguide within the frame 110 (not shown in FIG. 1A) that guides the backpressure waves to a tissue transducer (the tissue transducer 172 and/or the tissue transducer 170) located farther away on the frame 110. The tissue transducer 172 is thus configured to convert an acoustic signal (i.e., the backpressure) into mechanical vibrations of the at least one tissue (e.g., bone and/or cartilage) of the user producing acoustic pressure waves. Additional details about the coupling between the speaker 160 and the tissue transducer 172 for driving the tissue transducer 172 are described in connection with FIGS. 3A-3C.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a non-transitory computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

In accordance with embodiments of the present disclosure, the audio controller 150 controls operations of one or more components (e.g., one or more transducers) of the audio system. In some embodiments, the audio controller 150 generates first audio instructions for the speaker 160 instructing the speaker to generate airborne acoustic waves. The airborne acoustic waves cause a backpressure that drives the tissue transducer 170 and/or the tissue transducer 172 to vibrate at least one tissue of the user (e.g., cartilage and/or part of a head's bone) causing the at least one tissue to create acoustic pressure waves that form at least a portion of audio content for presentation to the user. Additionally, the audio controller 150 may initiate the speaker 160 (e.g., via second audio instructions) to generate airborne acoustic pressure waves. The airborne acoustic pressure waves generated by the speaker 160 and the acoustic pressure waves generated by the tissue transducer 170 and/or the tissue transducer 172 together form audio content that is presented to the user.

In some embodiments, the audio system is fully integrated into the headset 100. In some other embodiments, the audio system is distributed among multiple devices, such as between a computing device (e.g., smart phone or a console) and the headset 100. The computing device may be interfaced (e.g., via a wired or wireless connection) with the headset 100. In such cases, some of the processing steps presented herein may be performed at a portion of the audio system integrated into the computing device. For example, one or more functions of the audio controller 150 may be implemented at the computing device. More details about the structure and operations of the audio system are described in connection with FIG. 2, FIGS. 3A-3C, FIG. 4 and FIG. 5.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

The audio system can use positional information describing the headset 100 (e.g., from the position sensor 190) to update virtual positions of sound sources so that the sound sources are positionally locked relative to the headset 100. In this case, when the user wearing the headset 100 turns their head, virtual positions of the virtual sources move with the head. Alternatively, virtual positions of the virtual sources are not locked relative to an orientation of the headset 100. In this case, when the user wearing the headset 100 turns their head, apparent virtual positions of the sound sources would not change.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more red-green-blue (RGB) cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 2, FIGS. 3A-3C, and FIG. 5.

Figure 1B:
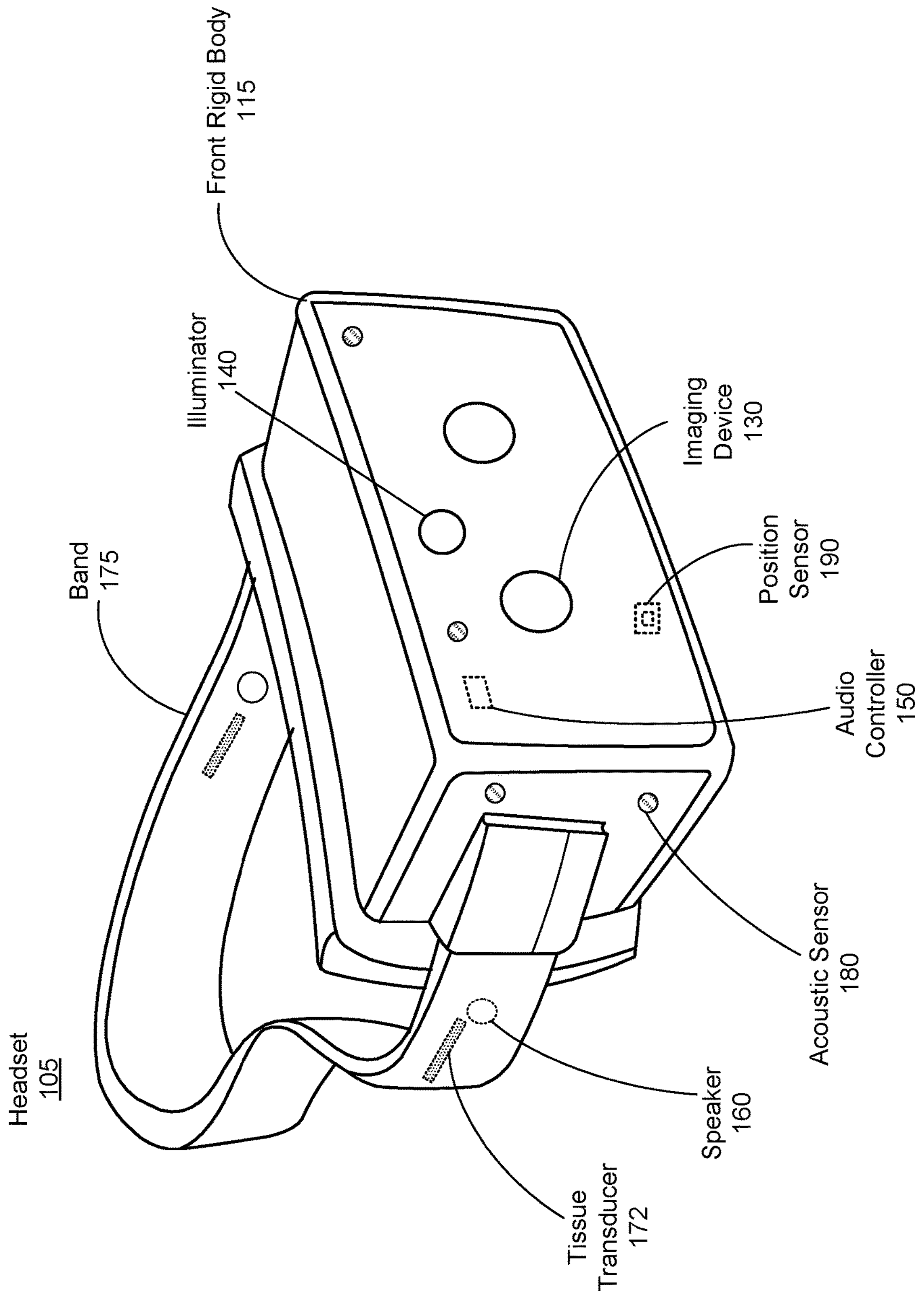
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of tissue transducers 172, a plurality of the imaging devices 130, a plurality of acoustic sensors 180, and the position sensor 190. The speakers 160 and the tissue transducers 172 may be located in various locations, such as coupled to the band 175 (as shown), coupled to the front rigid body 115, or may be configured to be inserted within the ear canal of a user.

Figure 2:
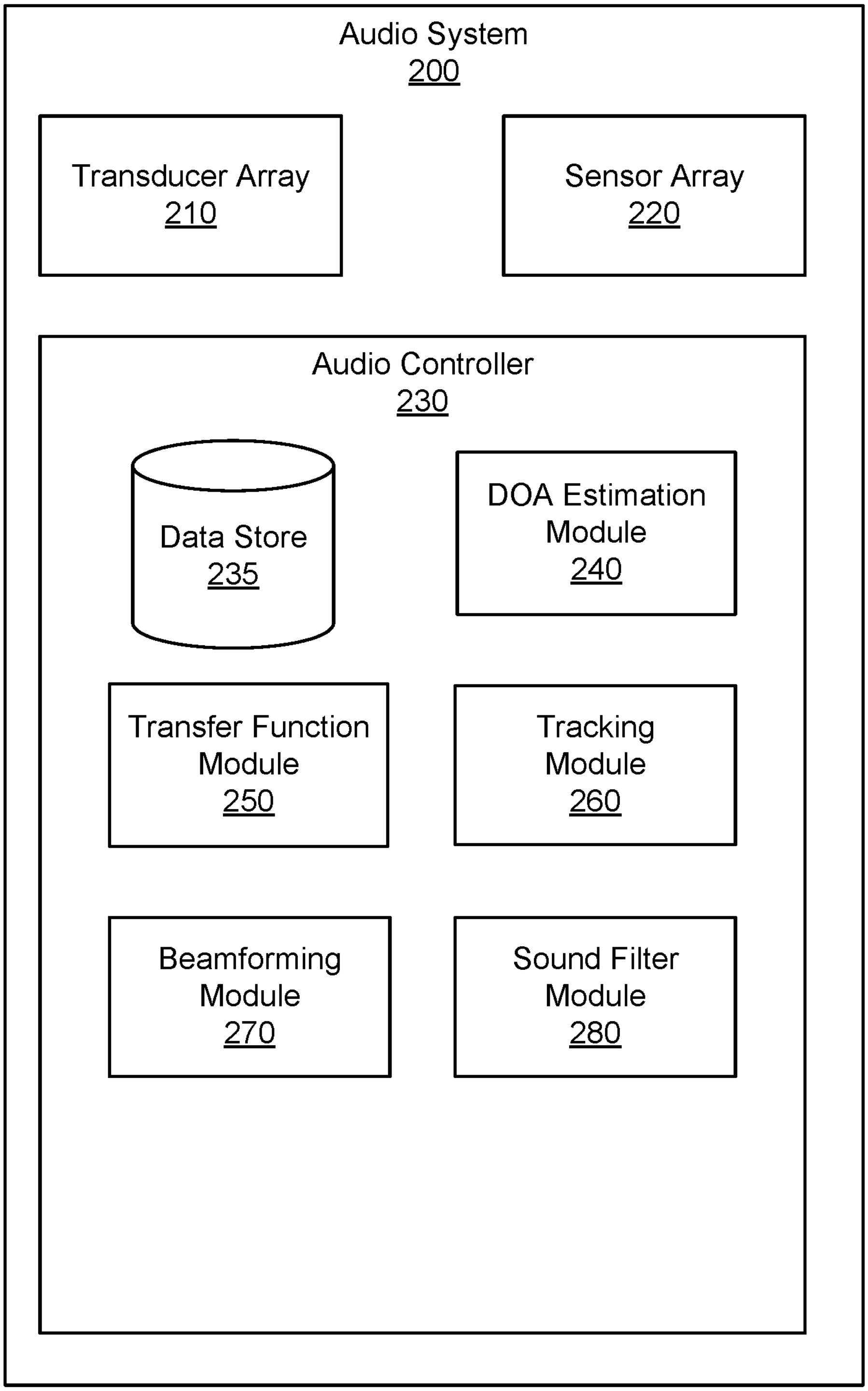
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a pair of transducers, i.e., one transducer for each ear. A transducer is a device that provides audio content. A transducer may be, e.g., a speaker (e.g., the speaker 160), a tissue transducer (e.g., the tissue transducer 170 and/or the tissue transducer 172), some other device that provides audio content, or some combination thereof. A tissue transducer may be configured to function as a bone conduction transducer or a cartilage conduction transducer. The transducer array 210 may present audio content via air conduction (e.g., via one or two speakers), via bone conduction (via one or two bone conduction transducer), via cartilage conduction audio system (via one or two cartilage conduction transducers), or some combination thereof.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a pair of speakers each coupled to a corresponding tissue transducer that are separate from the wearable device (e.g., coupled to an external console).

In accordance with embodiments of the present disclosure, the transducer array 210 is configured to enhance low audio frequencies, i.e., audio frequencies below a defined threshold frequency (e.g., 1000 Hz). The transducer array 210 may include at least one tissue transducer (e.g., cartilage conduction transducer and/or bone conduction transducer) and a speaker (i.e., an air conduction transducer) that drives the at least one tissue transducer. The at least one tissue transducer is configured to be coupled to (i.e., in contact with) at least one tissue (e.g., a pinna and/or part of a bone) of a portion of a body (e.g., ear and/or skull) of the user, and the speaker is coupled to the tissue transducer, e.g., via a backvolume propagating low frequency acoustic pressure waves (i.e., a backpressure) from the speaker to the tissue transducer. Note that high frequency acoustic pressure waves generated by the speaker would not affect the tissue transducer, i.e., the speaker and the tissue transducer are isolated with respect to high frequency acoustic pressure waves. The speaker may include a diaphragm having a first surface and a second surface that is opposite the first surface. The first surface of the speaker may be configured to generate a first set of airborne acoustic pressure waves, and the second surface may be configured to generate the backpressure. The tissue transducer is driven by the back-pressure to vibrate the at least one tissue to form a second set of acoustic pressure waves (e.g., airborne acoustic pressure waves). The first set of airborne acoustic pressure waves and the second set of acoustic pressure waves together form audio content that is presented to the user. Additional details regarding the structure and operations of transducers of the transducer array 210 are discussed below in connection with FIGS. 3A-3C, and FIG. 4.

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, and a sound filter module 280. The audio controller 230 may be located inside a headset, in some embodiments. Some embodiments of the audio controller 230 have different components than those described here. Similarly, functions can be distributed among the components in different manners than described here. For example, some functions of the audio controller 230 may be performed external to the headset. The user may opt in to allow the audio controller 230 to transmit data captured by the headset to systems external to the headset, and the user may select privacy settings controlling access to any such data.

In accordance with embodiments of the present disclosure, the audio controller 230 controls operations of the transducer array 210 to provide enhancement of low audio frequencies, i.e., audio frequencies below a defined threshold frequency (e.g., 1000 Hz for the air conduction transducer having a bandwidth between approximately 1000 Hz and 20 kHz). The audio controller 230 may generate audio instructions for a speaker of the transducer array 210 instructing the speaker to generate to generate airborne acoustic waves. The airborne acoustic waves cause a back-pressure that drives at least one tissue transducer of the transducer array 210 (e.g., cartilage conduction transducer and/or bone conduction transducer) to vibrate at least one tissue of a portion of user's head (e.g., a cartilage and/or a part of bone) causing the at least one tissue to create acoustic pressure waves that form at least a portion of audio content for presentation to the user. Additionally, the audio controller 230 may initiate the speaker (e.g., via audio instructions) to directly generate airborne acoustic pressure waves. The airborne acoustic pressure waves directly generated by the speaker and the acoustic pressure waves generated by the at least one tissue transducer together form audio content that is presented to the user.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, virtual positions of sound sources, multi-source audio signals, signals for transducers (e.g., speakers) for each ear, and other data relevant for use by the audio system 200, or any combination thereof. The data store 235 may be implemented as a non-transitory computer-readable storage medium.

The user may opt-in to allow the data store 235 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be ATFs, HRTFs, other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 5).

Figure 3A:
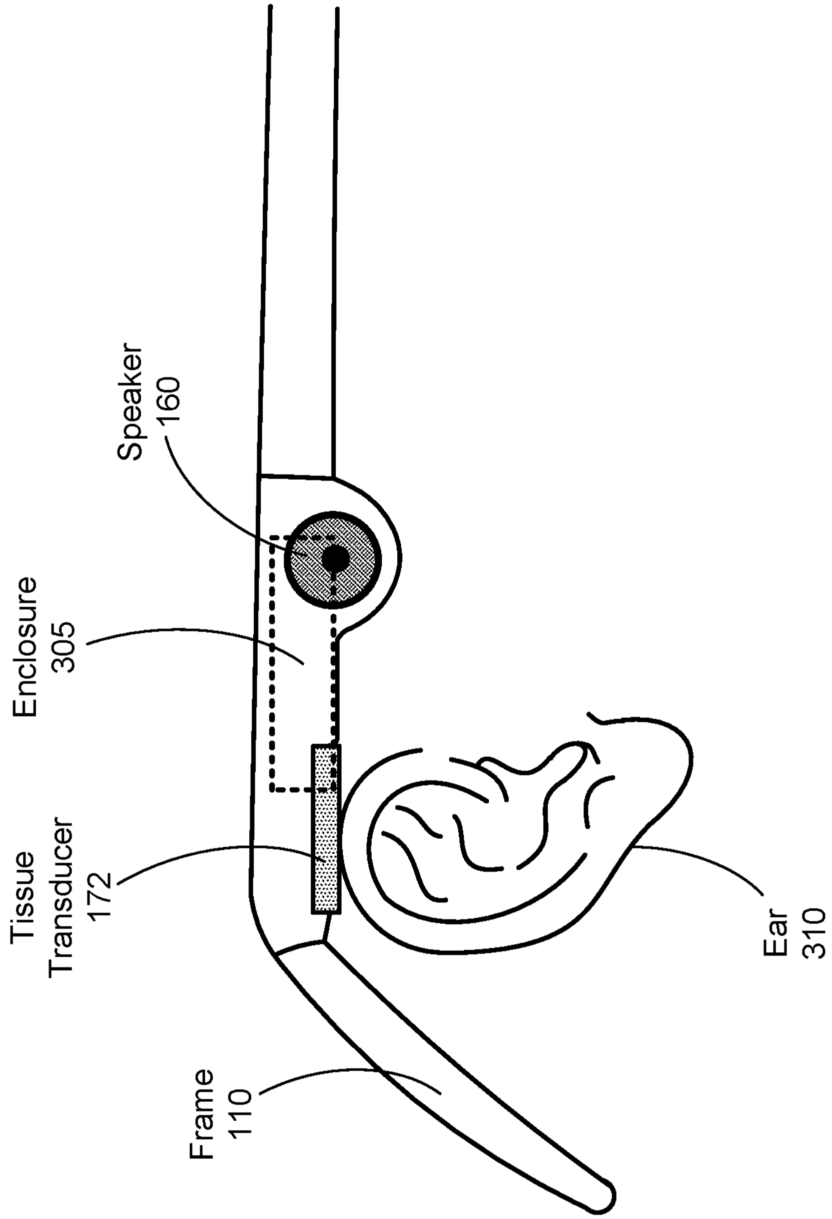
FIG. 3A illustrates an example implementation of a portion of an audio system that includes a speaker configured to drive a tissue transducer, in accordance with one or more embodiments.

FIG. 3A illustrates an example implementation 300 of a portion of the audio system that includes the speaker 160 configured to drive the tissue transducer 172, in accordance with one or more embodiments. The speaker 160 generates airborne acoustic pressure waves as well as a backpressure for driving the tissue transducer 172. The speaker 160 is mounted on the frame 110 of the headset 100, and the speaker 160 is located at least partially within an enclosure 305 (i.e., sealed volume) that is integrated into the frame 110. The speaker 160 may generate airborne acoustic waves causing the backpressure, Pb, within the enclosure 305 based on, e.g., first audio instructions from the audio controller 150 (not shown in FIG. 3A). The speaker 160 may also generate airborne acoustic pressure waves based on, e.g., second audio instructions from the audio controller 150. The airborne acoustic pressure waves generated by the speaker 160 may travel through air in an ear canal of an ear 310 to an eardrum where the airborne acoustic pressure waves are perceived as sound by the user.

The tissue transducer 172 may vibrate a tissue (e.g., pinna or bone) of a portion of a user's body (e.g., ear and/or skull) causing the tissue to create acoustic pressure waves that form at least a portion of audio content for presentation to the user. A first side of the tissue transducer 172 may be coupled to the enclosure 305, and a second side of the tissue transducer 172 may be coupled to (i.e., in contact with) the user's tissue. The tissue transducer 172 may be also mounted on the frame 110 of the headset 100. A portion of the tissue transducer 172 may be part of the enclosure 305. In one or more embodiments (not shown in FIG. 3A), a rubber hose as part of the tissue transducer 172 is connected to the enclosure 305 behind the speaker 160. The speaker 160 may create pressure fluctuations in the enclosure 305 (i.e., in the back volume), and these pressure fluctuations may be carried into the tissue transducer 172. The tissue transducer 172 may be driven by the backpressure formed by the pressure fluctuations in the enclosure 305 to vibrate the user's tissue causing the tissue to vibrate and create the acoustic pressure waves.

In some embodiments, the tissue transducer 172 is implemented as a contact pad (i.e., contact element) coupled to a tissue of the user (e.g., a pinna or a bone behind ear), wherein the contact pad when driven by the backpressure vibrates the tissue generating the acoustic pressure waves. In one embodiment, the tissue transducer 172 is implemented as a flexible bodied volume, e.g., a soft bodied volume or a silicon tube having the walls that would be expanded and contracted by the backpressure. In another embodiment, the tissue transducer 172 is implemented as a rigid contact element with a flexible edge that provides vibrations. In yet another embodiment, the tissue transducer 172 is implemented as a contact element having an interface made of a thin flexible material (e.g., rubber-based material). The acoustic pressure waves generated by the vibrating tissue together with the airborne acoustic pressure waves generated by the speaker 160 form the audio content for presentation to the user.

In one or more embodiments, the tissue transducer 172 is implemented as a cartilage conduction transducer directly coupled to, e.g., a pinna of the ear 310. In such case, the cartilage conduction transducer is driven by the backpressure in the enclosure 305 generated by the speaker 160 to vibrate the pinna causing the pinna to create airborne acoustic pressure waves. The airborne acoustic pressure waves generated by vibrating the pinna may be created at the entrance of the ear canal of the ear 310, and these airborne acoustic pressure waves may travel through air in the ear canal to the eardrum of the ear 310 where these airborne acoustic pressure waves are perceived as sound by the user. In one or more other embodiments, the tissue transducer 172 is implemented as a bone conduction transducer coupled to at least a portion of a bone behind the ear 310. The bone conduction transducer may be driven by the backpressure in the enclosure 305 generated by the speaker 160 to vibrate the bone causing the bone to create bone borne acoustic pressure waves that form a portion of audio content for presentation to the user.

In some embodiments, at least one of a mass of the tissue transducer 172 implemented as a contact element, one or more other parameters of the tissue transducer 172 and one or more parameters (e.g., stiffness parameters) of the speaker 160 are tunable (e.g., at a design time) causing a spectrum of the audio content below a defined threshold frequency (e.g., below 1000 Hz) to be enhanced. Some examples of the tunable parameters of the speaker 160 and/or the tissue transducer 172 include: a mass of a cone of the speaker 160, stiffness of one or more flexible components of the speaker 160, a volume of air coupling the speaker 160 to the tissue transducer 172, a mass of a contact pad of the tissue transducer 170, etc. Additionally or alternatively, at least one of a volume of the enclosure 305 and a stiffness of the enclosure 305 are tunable (e.g., at a design time) causing the spectrum of the audio content below the defined frequency to be enhanced. For example, the mass of the tissue transducer 172 implemented as the contact element, the volume of the enclosure 305, and the one or more audio parameters of the speaker 160 may be adjusted to be resonant in a manner that maximizes efficiency of a low frequency audio output (e.g., audio content below 1000 Hz).

Figure 3B:
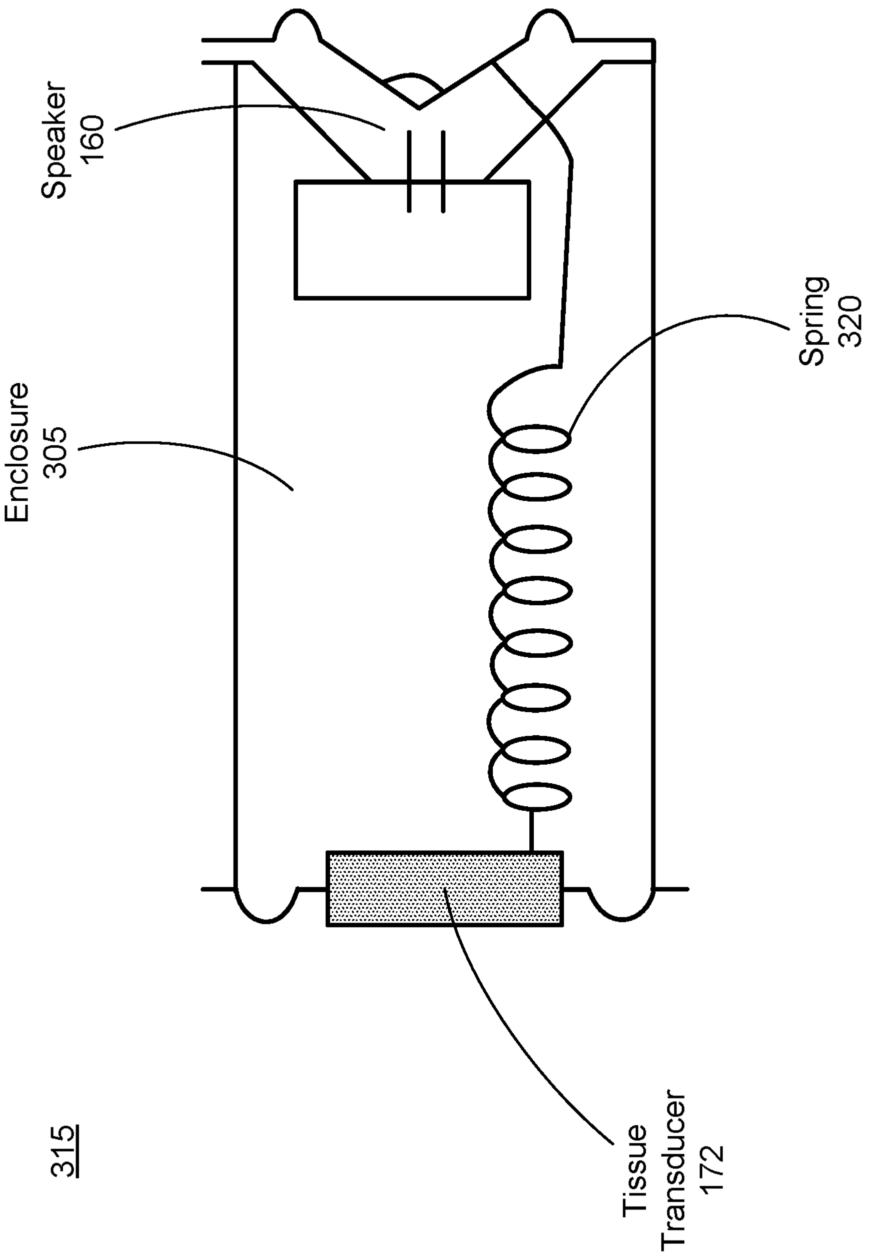
FIG. 3B illustrates a model of the implementation of the portion of the audio system from FIG. 3A, in accordance with one or more embodiments.

FIG. 3B illustrates a model 315 of the implementation of the portion of the audio system from FIG. 3A, in accordance with one or more embodiments. The model 315 includes the speaker 160 within the enclosure 305 (i.e., sealed volume) that is coupled to the tissue transducer 172 via a spring 320. The spring 320 models a movement of a back-volume air within the enclosure 305 initiated by the speaker 160 that forms the backpressure, Pb, within the enclosure 305. The backpressure then drives the tissue transducer 172 to vibrate a tissue of the user (e.g., pinna or bone behind ear) to generate acoustic pressure waves. A stiffness of the air volume within the enclosure 305 and masses of system components (e.g., of the speaker 160, the enclosure 305 and/or the tissue transducer 172) can be tuned to maximize efficiency at low frequencies (e.g., frequencies below 1000 Hz).

As aforementioned, the speaker 160 may also generate airborne acoustic pressure waves that travel in a direction different than (e.g., opposite to) a direction of the movement of the back-volume air within the enclosure 305. For example, the airborne acoustic pressure waves generated by the speaker 160 may travel outside of the enclosure 305 directly through an entrance of the ear canal to the eardrum of the ear 310 where these airborne acoustic pressure waves are perceived as sound by the user. The acoustic pressure waves generated by the vibrating tissue (due to vibration of the tissue transducer 172) and the airborne acoustic pressure waves generated by the speaker 160 together form audio content that is presented to the user.

Figure 3C:
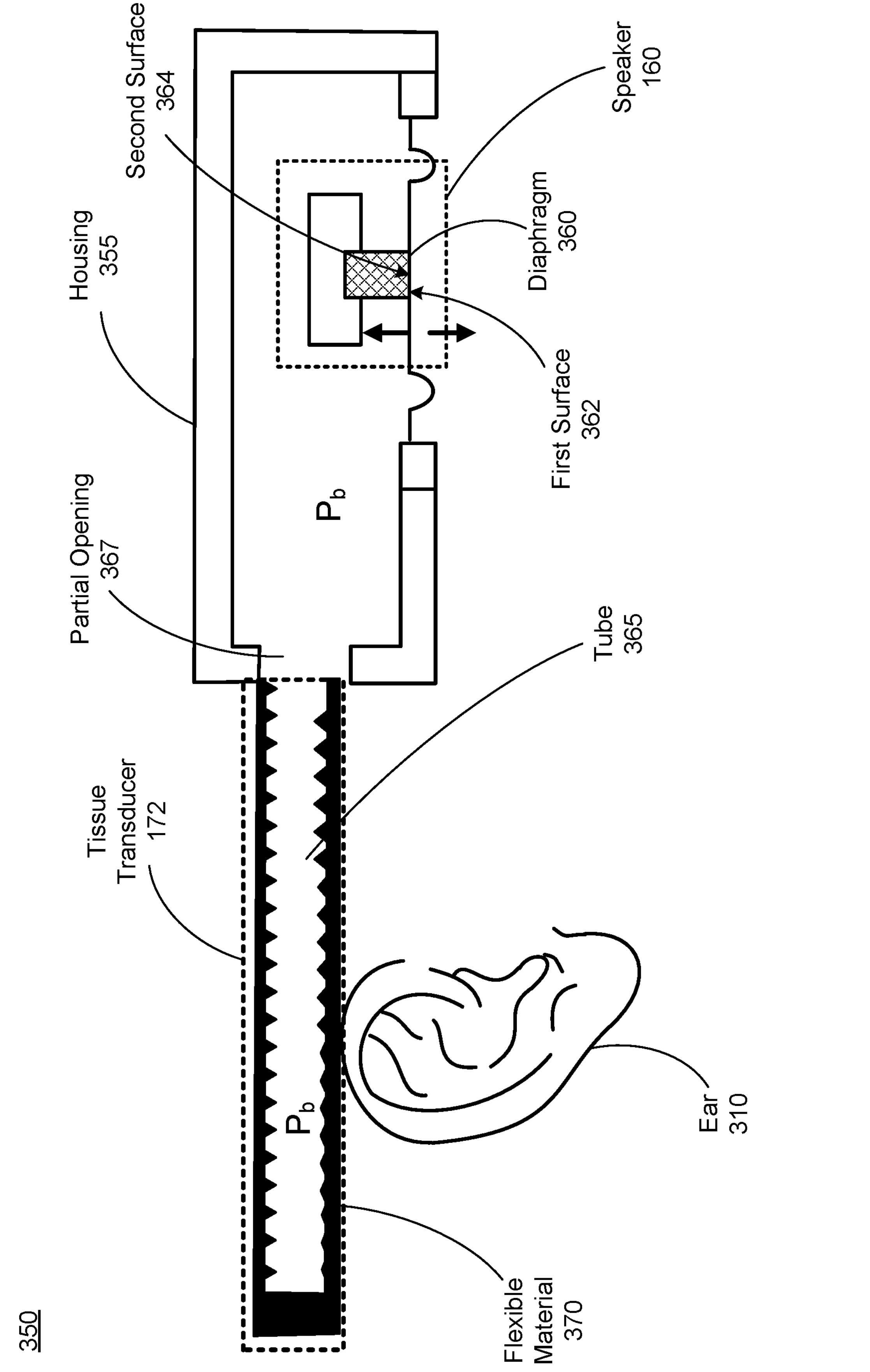
FIG. 3C illustrates another example implementation of a portion of an audio system that includes a speaker configured to drive to a tissue transducer, in accordance with one or more embodiments.

FIG. 3C illustrates another example implementation 350 of a portion of the audio system that includes the speaker 160 configured to drive the tissue transducer 172, in accordance with one or more embodiments. The speaker 160 generates airborne acoustic pressure waves as well as a backpressure for driving the tissue transducer 172. The speaker 160 is located within a housing 355 that is, e.g., integrated into the frame 110 of the headset 100. The speaker 160 may generate airborne acoustic waves causing a backpressure, Pb, within the housing 355 based on, e.g., first audio instructions from the audio controller 150 (not shown in FIG. 3C). The speaker 160 may also generate airborne acoustic pressure waves outside of the housing 355 based on, e.g., second audio instructions from the audio controller 150.

The speaker 160 may include a diaphragm 360 having a first surface 362 and a second surface 364 that is opposite the first surface 364. The first surface 362 may generate the airborne acoustic pressure waves that travel, e.g., outside of the housing 355 and to the ear canal of the ear 310 towards the eardrum where these airborne acoustic pressure waves are perceived as sound by the user. The second surface 364 may generate a movement of the back-volume air within the housing 355 that forms the backpressure, Pb, within the housing 355.

Driven by the backpressure in the housing 355, the tissue transducer 172 may vibrate a tissue of a portion of a user's body (e.g., pinna or bone behind ear) causing the tissue to create acoustic pressure waves that form at least a portion of audio content for presentation to the user. The tissue transducer 172 may include a tube 365 connected with the housing 355 (i.e., a back-volume of the speaker 160) via, e.g., a partial opening 367. The tube 365 may be implemented as a flexible hollow component. The movement of the back-volume air within the housing 355 that forms the backpressure within the housing 355, Pb, is transferred to the tube 365. Walls of the tube 365 may be made of a flexible material 370 (e.g., rubber). Due to the backpressure, Pb, the flexible walls of the tube 365 push on the user's tissue (e.g., pinna or part of bone in a skull) onto which the tissue transducer 172 is coupled to, which causes transmission of vibrations to the tissue that generates acoustic pressure waves. The acoustic pressure waves generated by the vibrating tissue may be airborne acoustic pressure waves travelling through air in the ear canal of the ear 310 to the eardrum where these acoustic pressure waves are perceived as sound by the user. Alternatively, the acoustic pressure waves generated by the vibrating tissue may be bone borne acoustic pressure waves that propagate toward the user's cochlea, bypassing the eardrum. The acoustic pressure waves generated by the vibrating tissue together with the airborne acoustic pressure waves generated by the speaker 160 form the audio content for presentation of the user.

Figure 4:
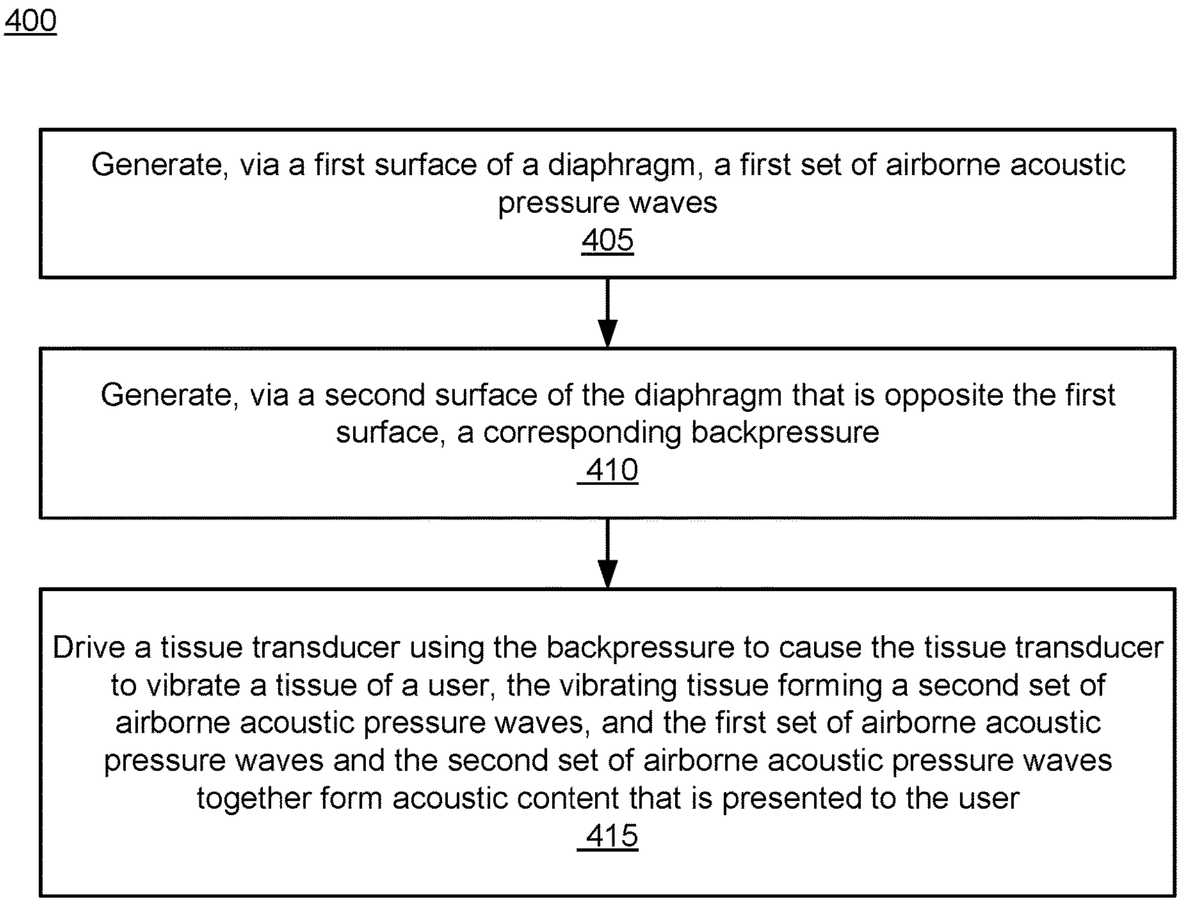
FIG. 4 is a flowchart illustrating a process for generating audio content by an audio system that includes a tissue transducer that drives an air conduction transducer, in accordance with one or more embodiments.

FIG. 4 is a flowchart illustrating a process 400 for generating audio content by an audio system that includes a tissue transducer that drives a speaker, in accordance with one or more embodiments. The process shown in FIG. 4 may be performed by components of an audio system (e.g., the audio system 200). Other entities may perform some or all of the steps in FIG. 4 in other embodiments. Embodiments may include different and/or additional steps, or perform the steps in different orders.

The audio system generates 405, via a first surface of a diaphragm, a first set of airborne acoustic pressure waves. The diaphragm is part of the air conduction transducer that is configured to drive the tissue transducer.

The audio system generates 410, via a second surface of the diaphragm that is opposite the first surface, a corresponding backpressure. The audio system may generate the corresponding backpressure within an enclosure that encompasses the diaphragm and at least a portion of the tissue transducer, and the tissue transducer is coupled to (i.e., in contact with) a tissue of a portion of a user's body (e.g., pinna or bone behind ear). Alternatively, the audio system may generate the corresponding backpressure in a housing that encompasses the diaphragm and is connected to a flexible hollow component (e.g., tube) forming at least a portion of the tissue transducer.

The audio system drives 415 the tissue transducer using the backpressure to cause the tissue transducer to vibrate the user's tissue, the vibrating tissue forming a second set of acoustic pressure waves, and the first set of airborne acoustic pressure waves and the second set of acoustic pressure waves together form audio content that is presented to the user. In one embodiment, the audio system drives the tissue transducer by the corresponding backpressure to vibrate the tissue causing the tissue to create the second set of acoustic pressure waves. In another embodiment, the audio system drives the flexible hollow component of the tissue transducer by the corresponding backpressure to vibrate the tissue causing the tissue to create the second set of acoustic pressure waves.

System Environment

Figure 5:
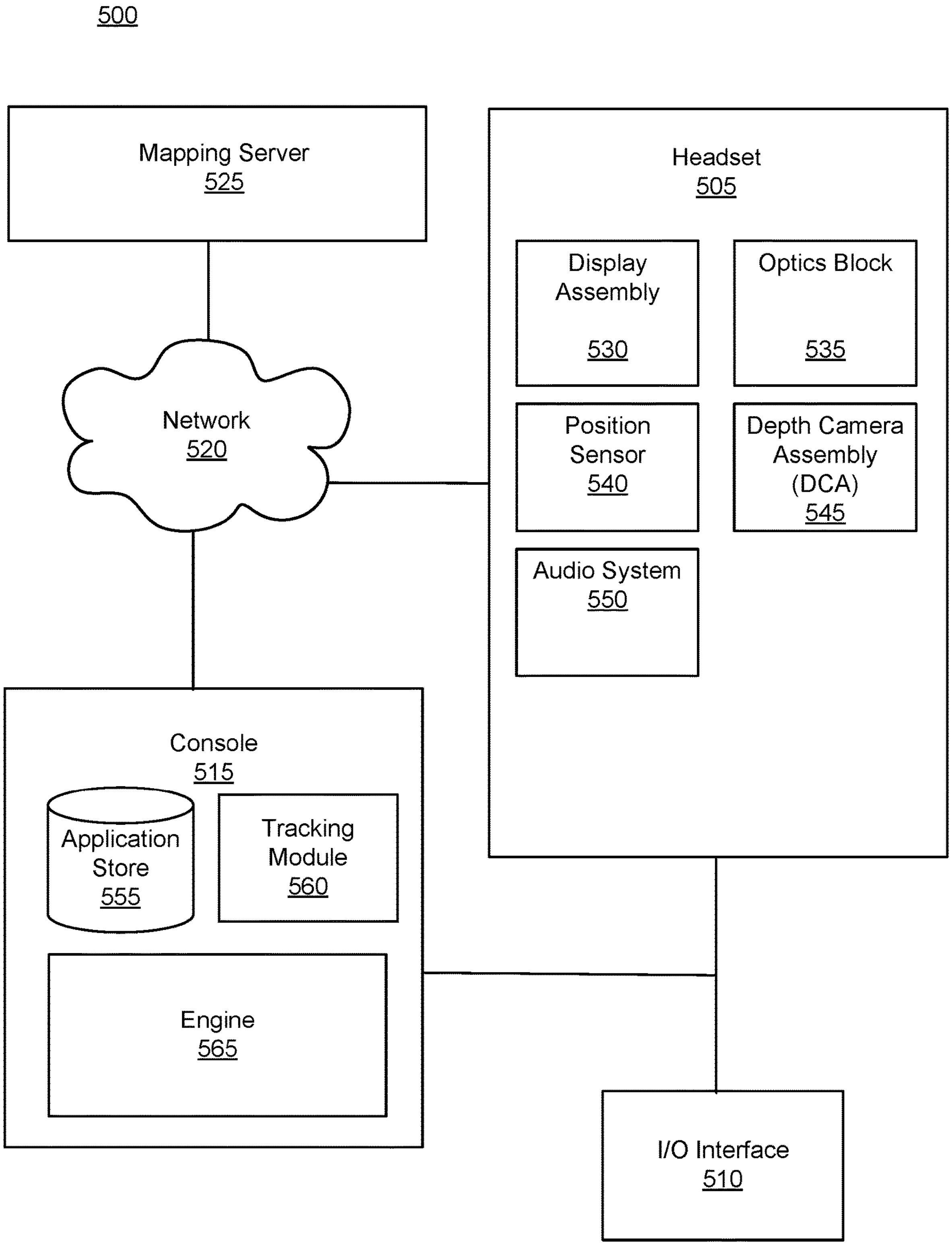
FIG. 5 is a system that includes a headset, in accordance with one or more embodiments.

FIG. 5 is a system 500 that includes a headset 505, in accordance with one or more embodiments. In some embodiments, the headset 505 may be the headset 100 of FIG. 1A or the headset 105 of FIG. 1B. The system 500 may operate in an artificial reality environment (e.g., a virtual reality environment, an augmented reality environment, a mixed reality environment, or some combination thereof). The system 500 shown by FIG. 5 includes the headset 505, an input/output (I/O) interface 510 that is coupled to a console 515, the network 520, and the mapping server 525. While FIG. 5 shows an example system 500 including one headset 505 and one I/O interface 510, in other embodiments any number of these components may be included in the system 500. For example, there may be multiple headsets each having an associated I/O interface 510, with each headset and I/O interface 510 communicating with the console 515. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 515 may be provided by the headset 505.

The headset 505 includes the display assembly 530, an optics block 535, one or more position sensors 540, and the DCA 545. Some embodiments of headset 505 have different components than those described in conjunction with FIG. 5. Additionally, the functionality provided by various components described in conjunction with FIG. 5 may be differently distributed among the components of the headset 505 in other embodiments, or be captured in separate assemblies remote from the headset 505.

The display assembly 530 displays content to the user in accordance with data received from the console 515. The display assembly 530 displays the content using one or more display elements (e.g., the display elements 120). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 535.

The optics block 535 may magnify image light received from the electronic display, corrects optical errors associated with the image light, and presents the corrected image light to one or both eye boxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The position sensor 540 is an electronic device that generates data indicating a position of the headset 505. The position sensor 540 generates one or more measurement signals in response to motion of the headset 505. The position sensor 190 is an embodiment of the position sensor 540. Examples of a position sensor 540 include: one or more IMUS, one or more accelerometers, one or more gyroscopes, one or more magnetometers, another suitable type of sensor that detects motion, or some combination thereof. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 505 from the sampled data. For example, the IMU integrates the measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, however, in practice the reference point is defined as a point within the headset 505.

The DCA 545 generates depth information for a portion of the local area. The DCA includes one or more imaging devices and a DCA controller. The DCA 545 may also include an illuminator. Operation and structure of the DCA 545 is described above with regard to FIG. 1A.

The audio system 550 provides audio content to a user of the headset 505. The audio system 550 is substantially the same as the audio system 200 described above. The audio system 550 may comprise one or more acoustic sensors, at least a pair of transducers (e.g., an air conduction transducer coupled to at least one tissue transducer), and an audio controller. The audio system 550 is configured to provide enhancement to low frequencies (i.e., frequencies below of a define threshold frequency) of the audio content for presentation to the user of the headset 505. In accordance with embodiments of the present disclosure, the air conduction transducer of the audio system 550 generates airborne acoustic waves causing a backpressure that drives the at least one tissue transducer to vibrate a tissue of the user (e.g., a pinna or portion of a bone in a skull), which produces acoustic pressure waves with enhanced audio frequencies in a low frequency band (e.g., frequency band below 1000 Hz). The audio system 550 may provide spatialized audio content to the user. In some embodiments, the audio system 550 may request acoustic parameters from the mapping server 525 over the network 520. The acoustic parameters describe one or more acoustic properties (e.g., room impulse response, a reverberation time, a reverberation level, etc.) of the local area. The audio system 550 may provide information describing at least a portion of the local area from e.g., the DCA 545 and/or location information for the headset 505 from the position sensor 540. The audio system 550 may generate one or more sound filters using one or more of the acoustic parameters received from the mapping server 525, and use the sound filters to provide audio content to the user.

The I/O interface 510 is a device that allows a user to send action requests and receive responses from the console 515. An action request is a request to perform a particular action. For example, an action request may be an instruction to start or end capture of image or video data, or an instruction to perform a particular action within an application. The I/O interface 510 may include one or more input devices. Example input devices include: a keyboard, a mouse, a game controller, or any other suitable device for receiving action requests and communicating the action requests to the console 515. An action request received by the I/O interface 510 is communicated to the console 515, which performs an action corresponding to the action request. In some embodiments, the I/O interface 510 includes an IMU that captures calibration data indicating an estimated position of the I/O interface 510 relative to an initial position of the I/O interface 510. In some embodiments, the I/O interface 510 may provide haptic feedback to the user in accordance with instructions received from the console 515. For example, haptic feedback is provided when an action request is received, or the console 515 communicates instructions to the I/O interface 510 causing the I/O interface 510 to generate haptic feedback when the console 515 performs an action.

The console 515 provides content to the headset 505 for processing in accordance with information received from one or more of: the DCA 545, the headset 505, and the I/O interface 510. In the example shown in FIG. 5, the console 515 includes an application store 555, a tracking module 560, and an engine 565. Some embodiments of the console 515 have different modules or components than those described in conjunction with FIG. 5. Similarly, the functions further described below may be distributed among components of the console 515 in a different manner than described in conjunction with FIG. 5. In some embodiments, the functionality discussed herein with respect to the console 515 may be implemented in the headset 505, or a remote system.

The application store 555 stores one or more applications for execution by the console 515. An application is a group of instructions, that when executed by a processor, generates content for presentation to the user. Content generated by an application may be in response to inputs received from the user via movement of the headset 505 or the I/O interface 510. Examples of applications include: gaming applications, conferencing applications, video playback applications, or other suitable applications.

The tracking module 560 tracks movements of the headset 505 or of the I/O interface 510 using information from the DCA 545, the one or more position sensors 540, or some combination thereof. For example, the tracking module 560 determines a position of a reference point of the headset 505 in a mapping of a local area based on information from the headset 505. The tracking module 560 may also determine positions of an object or virtual object. Additionally, in some embodiments, the tracking module 560 may use portions of data indicating a position of the headset 505 from the position sensor 540 as well as representations of the local area from the DCA 545 to predict a future location of the headset 505. The tracking module 560 provides the estimated or predicted future position of the headset 505 or the I/O interface 510 to the engine 565.

The engine 565 executes applications and receives position information, acceleration information, velocity information, predicted future positions, or some combination thereof, of the headset 505 from the tracking module 560. Based on the received information, the engine 565 determines content to provide to the headset 505 for presentation to the user. For example, if the received information indicates that the user has looked to the left, the engine 565 generates content for the headset 505 that mirrors the user's movement in a virtual local area or in a local area augmenting the local area with additional content. Additionally, the engine 565 performs an action within an application executing on the console 515 in response to an action request received from the I/O interface 510 and provides feedback to the user that the action was performed. The provided feedback may be visual or audible feedback via the headset 505 or haptic feedback via the I/O interface 510.

The network 520 couples the headset 505 and/or the console 515 to the mapping server 525. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 525 may include a database that stores a virtual model describing a plurality of spaces, wherein one location in the virtual model corresponds to a current configuration of a local area of the headset 505. The mapping server 525 receives, from the headset 505 via the network 520, information describing at least a portion of the local area and/or location information for the local area. The user may adjust privacy settings to allow or prevent the headset 505 from transmitting information to the mapping server 525. The mapping server 525 determines, based on the received information and/or location information, a location in the virtual model that is associated with the local area of the headset 505. The mapping server 525 determines (e.g., retrieves) one or more acoustic parameters associated with the local area, based in part on the determined location in the virtual model and any acoustic parameters associated with the determined location. The mapping server 525 may transmit the location of the local area and any values of acoustic parameters associated with the local area to the headset 505.

One or more components of system 500 may contain a privacy module that stores one or more privacy settings for user data elements. The user data elements describe the user or the headset 505. For example, the user data elements may describe a physical characteristic of the user, an action performed by the user, a location of the user of the headset 505, a location of the headset 505, HRTFs for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 500 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed.

Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An audio system comprising:

at least one tissue transducer coupled to at least one tissue of a user;

an air conduction transducer coupled to the at least one tissue transducer; and a controller configured to generate audio instructions for the air conduction transducer instructing the air conduction transducer to generate airborne acoustic waves, the airborne acoustic waves causing a backpressure, wherein the at least one tissue transducer is driven by the backpressure to vibrate the at least one tissue causing the at least one tissue to create acoustic pressure waves that form at least a portion of audio content for presentation to the user.

2. The audio system of claim 1, wherein the air conduction transducer is mounted to an enclosure that includes at least a portion of the at least one tissue transducer.

3. The audio system of claim 1, wherein the at least one tissue transducer is driven by the backpressure to vibrate a pinna of an ear of the user causing the pinna to vibrate and create the acoustic pressure waves as airborne acoustic pressure waves.

4. The audio system of claim 1, wherein the at least one tissue transducer comprises one of a flexible bodied volume and a contact pad with a flexible edge.

5. The audio system of claim 1, wherein at least one of a mass of the tissue transducer and one or more parameters of the air conduction transducer are tunable causing a spectrum of the audio content below a threshold frequency to be modified.

6. The audio system of claim 1, wherein at least one of a volume of the enclosure and a stiffness of the enclosure are tunable causing a spectrum of the audio content below a threshold frequency to be modified.

7. The audio system of claim 1, wherein the air conduction transducer includes a diaphragm having a first surface and a second surface that is opposite the first surface, the first surface is configured to generate airborne acoustic pressure waves that together with the acoustic pressure waves form the audio content, and the second surface is configured to generate the backpressure.

8. The audio system of claim 1, wherein the at least one tissue transducer includes a flexible hollow component connected with a housing of the air conduction transducer.

9. The audio system of claim 8, wherein the backpressure generated in the housing drives walls of the flexible hollow component to vibrate the at least one tissue causing the at least one tissue to create the acoustic pressure waves.

10. The audio system of claim 1, wherein:

the at least one tissue transducer comprises a cartilage conduction transducer coupled to a pinna of an ear of the user; and the cartilage conduction transducer is driven by the backpressure to vibrate the pinna causing the pinna to create the acoustic pressure waves as airborne acoustic pressure waves.

11. The audio system of claim 10, wherein the airborne acoustic pressure waves are created at an entrance of an ear canal of the ear, and the airborne acoustic pressure waves travel through an air in the ear canal to an eardrum of the ear where the airborne acoustic pressure waves are perceived as sound by the user.

12. The audio system of claim 1, wherein the at least one tissue transducer comprises a bone conduction transducer coupled to a portion of a bone behind the ear.

13. The audio system of claim 12, wherein the bone conduction transducer is driven by the backpressure to vibrate the bone causing the bone to create the acoustic pressure waves as bone borne acoustic pressure waves.

14. The audio system of claim 1, wherein the audio system is part of a headset.

15. A method comprising:

generating, via a first surface of a diaphragm, a first set of airborne acoustic pressure waves;

generating, via a second surface of the diaphragm that is opposite the first surface, a corresponding backpressure; and driving a tissue transducer using the backpressure to cause the tissue transducer to vibrate a tissue of a user, the vibrating tissue forming a second set of acoustic pressure waves, and the first set of airborne acoustic pressure waves and the second set of acoustic pressure waves together form audio content that is presented to the user.

16. The method of claim 15, further comprising:

generating the corresponding backpressure within an enclosure that encompasses the diaphragm and at least a portion of the tissue transducer; and driving the tissue transducer by the corresponding backpressure to vibrate the tissue causing the tissue to create the second set of acoustic pressure waves.

17. The method of claim 15, further comprising:

generating the corresponding backpressure in a housing that encompasses the diaphragm and is connected to a flexible hollow component forming at least a portion of the tissue transducer; and driving the flexible hollow component by the corresponding backpressure to vibrate the tissue causing the tissue to create the second set of acoustic pressure waves.

18. An audio system comprising:

a tissue transducer configured to be coupled to a pinna of an ear of a user; and a speaker coupled to the tissue transducer, the speaker including a diaphragm having a first surface and a second surface that is opposite the first surface, the first surface is configured to generate a first set of airborne acoustic pressure waves, and the second surface is configured to generate a backpressure, wherein the tissue transducer is driven by the backpressure to vibrate the pinna to form a second set of acoustic pressure waves, and the first set of airborne acoustic pressure waves and the second set of acoustic pressure waves together form audio content that is presented to the user.

19. The audio system of claim 18, wherein:

the speaker is mounted to an enclosure that includes at least a portion of the tissue transducer; and the tissue transducer is driven by the backpressure to vibrate the pinna causing the pinna to create the second set of acoustic pressure waves as airborne acoustic pressure waves.

20. The audio system of claim 18, further comprising:

a housing that encompasses the diaphragm and is connected to a flexible hollow component that forms at least a portion of the tissue transducer, wherein the flexible hollow component is driven by the corresponding backpressure to vibrate the tissue causing the tissue to create the second set of acoustic pressure waves.

* * * * *